US012594603B2

(12) United States Patent
Maiwald-Immer et al.

(10) Patent No.: US 12,594,603 B2
(45) Date of Patent: Apr. 7, 2026

(54) HEATING/COOLING OF A PROCESS CHAMBER OF A MANUFACTURING DEVICE FOR ADDITIVE MANUFACTURING OF THREE-DIMENSIONAL COMPONENTS

(71) Applicant: AM Metals GmbH, Halsbrücke (DE)

(72) Inventors: Tobias Maiwald-Immer, Dresden (DE); Axel Helm, Dresden (DE); Michael Härtel, Freiberg (DE)

(73) Assignee: AM Metals GmbH, Halsbrücke (DE)

( * ) Notice: Subject to any disclaimer, the term of this patent is extended or adjusted under 35 U.S.C. 154(b) by 12 days.

(21) Appl. No.: 17/309,210

(22) PCT Filed: Nov. 11, 2019

(86) PCT No.: PCT/EP2019/080840
§ 371 (c)(1),
(2) Date: May 6, 2021

(87) PCT Pub. No.: WO2020/099305
PCT Pub. Date: May 22, 2020

(65) Prior Publication Data
US 2021/0394273 A1 Dec. 23, 2021

(30) Foreign Application Priority Data

Nov. 12, 2018 (DE) ..................... 10 2018 128 243.5

(51) Int. Cl.
*B33Y 30/00* (2015.01)
*B22F 10/28* (2021.01)
(Continued)

(52) U.S. Cl.
CPC ............. *B22F 12/20* (2021.01); *B22F 10/28* (2021.01); *B22F 12/38* (2021.01); *B22F 12/70* (2021.01);
(Continued)

(58) Field of Classification Search
CPC ........... B22F 3/1055; B22F 2003/1056; B33Y 30/00; B29C 64/153
See application file for complete search history.

(56) References Cited

U.S. PATENT DOCUMENTS

2014/0202027 A1* 7/2014 Pink .................. H01L 21/67109
392/416
2017/0113410 A1 4/2017 Fruth
(Continued)

FOREIGN PATENT DOCUMENTS

CN 107848207 A 3/2018
CN 108188397 A 6/2018
(Continued)

OTHER PUBLICATIONS

"German Application No. 10 2018 128 243.5, Search Report dated Jul. 10, 2019", (Jul. 10, 2019), 9 pgs.
(Continued)

*Primary Examiner* — Farah Taufiq
(74) *Attorney, Agent, or Firm* — Polsinelli PC

(57) ABSTRACT

The invention relates to a production device for additively manufacturing three-dimensional components by the layer-by-layer application of a construction material by means of at least one coating unit and spatially selective solidification of a construction material by means of at least one irradiation unit, comprising a process chamber having at least one heat-reflecting apparatus, in particular heat-reflecting layer, which shields at least one portion of a surface within the process chamber.

9 Claims, 3 Drawing Sheets

(51) Int. Cl.

| | |
|---|---|
| *B22F 10/366* | (2021.01) |
| *B22F 12/00* | (2021.01) |
| *B22F 12/20* | (2021.01) |
| *B22F 12/70* | (2021.01) |
| *B22F 10/32* | (2021.01) |
| *B22F 10/36* | (2021.01) |
| *B22F 12/13* | (2021.01) |
| *B22F 12/45* | (2021.01) |
| *B22F 12/67* | (2021.01) |
| *B22F 12/90* | (2021.01) |

(52) U.S. Cl.
CPC .............. *B33Y 30/00* (2014.12); *B22F 10/32* (2021.01); *B22F 10/36* (2021.01); *B22F 10/366* (2021.01); *B22F 12/13* (2021.01); *B22F 12/45* (2021.01); *B22F 12/67* (2021.01); *B22F 12/90* (2021.01)

(56) References Cited

U.S. PATENT DOCUMENTS

| | | | |
|---|---|---|---|
| 2018/0311759 A1 | 11/2018 | Ackelid et al. | |
| 2020/0061922 A1* | 2/2020 | Meiners ................. | B22F 10/32 |
| 2022/0072786 A1* | 3/2022 | Weiss ................... | B29C 64/295 |

FOREIGN PATENT DOCUMENTS

| | | | | | |
|---|---|---|---|---|---|
| DE | 102013222339 | A1 | 5/2015 | | |
| DE | 102015118162 | A1 | 4/2017 | | |
| DE | 102012012344 | B4 * | 5/2018 | ............ | B22F 3/1055 |
| EP | 3395481 | A1 * | 10/2018 | ............ | B22F 3/1055 |
| JP | 2015151566 | A | 8/2015 | | |
| WO | WO-2017075285 | A1 | 5/2017 | | |
| WO | WO-2018197888 | A1 | 11/2018 | | |
| WO | WO-2019031979 | A1 * | 2/2019 | ............ | B33Y 30/00 |
| WO | WO-2020099305 | A1 | 5/2020 | | |

OTHER PUBLICATIONS

"International Application No. PCT/EP2019/080840, International Search Report and Written Opinion mailed Feb. 18, 2020", (Feb. 18, 2020), 11 pgs.

"International Application No. PCT/EP2019/080840, International Preliminary Report on Patentability dated May 11, 2021", 7 pgs.

"Chinese Application No. 201980083511.5, Notification of the First Office Action dated Nov. 21, 2022", (Nov. 21, 2022), 16 pgs.

"Japanese Application No. 2021-525776, Office Action mailed Jan. 9, 2024", (Jan. 9, 2024), 8 pgs.

* cited by examiner

HEATING/COOLING OF A PROCESS CHAMBER OF A MANUFACTURING DEVICE FOR ADDITIVE MANUFACTURING OF THREE-DIMENSIONAL COMPONENTS

PRIORITY CLAIM TO RELATED APPLICATIONS

This application is a U.S. national stage filing under 35 U.S.C. § 371 from International Application No. PCT/EP2019/080840, filed on 11 Nov. 2019, and published as WO2020/099305 on 22 May 2020, which claims the benefit under 35 U.S.C. 119 to German Application No. 10 2018 128 243.5, filed on 12 Nov. 2018, the benefit of priority of each of which is claimed herein, and which applications and publication are hereby incorporated herein by reference in their entirety.

TECHNICAL FIELD OF THE INVENTION

The invention relates to a manufacturing device for additive manufacturing of three dimensional components by layer wise application and locally selective solidification of a building material. The invention further relates to a method of operation and a method of manufacturing a corresponding manufacturing device.

BACKGROUND

Manufacturing devices and corresponding processes for the additive manufacturing of three dimensional components by layer wise application and locally selective solidification of a building material are known in principle from the prior art. For a layer wise application, at least one corresponding coating unit is usually provided. For local selective solidification, a corresponding irradiation unit (e.g. comprising at least one laser) is usually provided. In many applications, comparatively high temperatures can be reached during operation of the manufacturing devices (for example 500° C. or more). Often, for example, a building area is brought to a higher temperature to facilitate additive manufacturing or to generally enable it (for certain materials). To reduce a corresponding heat load, it is proposed, for example in DE 10 2013 222 339 A1, to separate a vertical drive for driving a support device for a platform by a wall, said wall comprising a thermally insulating material.

Furthermore, WO 2017/075285 A1 describes walls to be coolable. However, the focus at there is not directed towards the removal of undesired heat, but on conditioned down cooling to improve a manufacturing process (by solidification).

SUMMARY

It is an objective of the invention to provide a solution that is as simple as possible and yet effective in order to reduce or completely avoid any adverse effects or damage caused by heat generated in the process chamber.

The objective is solved in particular by a manufacturing device.

In particular, the objective is solved by a manufacturing device for additive manufacturing of three dimensional components by layer wise application by means of at least one coating unit and locally selective solidification of a building material by means of at least one irradiation unit (in particular comprising at least one laser), comprising a process chamber with at least one heat reflecting means, in particular heat reflecting layer, which shields at least a portion of a surface within the process chamber.

A core idea of the invention is to provide a heat reflecting means (in particular layer) so that certain areas of the manufacturing device can be shielded from the heat generated in the process chamber. In this way, an undesired overheating of possibly sensitive areas (such as drives) can be avoided or at least reduced in a simple manner. In a simple manner, the manufacturing device can also be operated when a high heat input (in particular in the area of a building area) occurs. This reduces costs, in particular during manufacturing and/or during operation.

The manufacturing device preferably comprises (in addition to at least one coating unit and at least one irradiation unit) at least one (building) platform for building up the three dimensional component. Furthermore, a lowering device (lifting device) can be provided for the building platform so that a new plane of the three dimensional component can be produced in each case. A corresponding adjustment drive (vertical drive) can be provided for such an adjustment. Furthermore, in particular at least one heating device is provided for heating a building area of the manufacturing device (for example by irradiation and/or by corresponding heating devices such as resistance heating devices and/or heating devices operating with a heated fluid). Preferably, at least one laser-based element, e.g. comprising at least one corresponding laser diode array, in particular based on VCSEL (Vertical Cavity Surface Emitting Laser), is used as the heating radiator or heating element. Such elements generate highly directional radiation starting from a small area. The individual laser elements can be controlled in a targeted manner, which means that the radiation distribution and thus the temperature on the surface of the component can be controlled very well.

Preferably, irradiation (for heating the building area) is realized in particular from above. Alternatively or additionally, heating is carried out from below (for example, of a base plate), possibly via a resistance heating device, and simultaneously heating of a powder bed surface or of the building area is carried out from above, in particular via at least one radiant heater. Specifically, the (powdered) building material can be preheated from below and additionally brought (by irradiation from above) to its process temperature (at which the irradiation unit then ultimately acts to locally solidify the buildup material).

Heating from above is particularly advantageous, as it allows effective or appropriate heating to be achieved in a simple manner. In particular, it has been recognized that, for example, a heated base plate loses relevance above a certain building height, even though it can be advantageous for maintaining a certain temperature field.

The radiation unit preferably comprises at least one laser.

The at least one coating unit preferably comprises at least one coating arm, which is preferably horizontally movable so that the building material can be applied in layers. For this purpose, the material can be provided by means of a corresponding storage device (storage container) for the building material. Spare building material can be collected, in particular, in a corresponding collection device (collection container).

The (additive) manufacturing device according to the invention and the corresponding manufacturing method are generally characterized by the fact that objects (components) can be manufactured layer wise by solidification a (in particular shapeless) building material. The solidification can be realized by supplying thermal energy to the building material by irradiating it with electromagnetic radiation or particle radiation, for example in laser sintering ("SLS" or "DMLS"), laser melting or electron beam melting. Preferably, the manufacturing device is designed as a laser sintering or laser melting device. In laser sintering or laser melting, the area of impact of the laser beam (laser spot) on a layer of the building material is moved over those points of the layer which correspond to the component cross section of the component to be manufactured in this layer. A thin layer of a powdered building material is repeatedly applied and the building material in each layer is selectively solidified locally by selective irradiation with at least one laser beam.

Shielding means in particular that the (respective) heat reflecting means is located at least partially between a heat source (e.g. a building area of the manufacturing device) and the portion of the surface to be protected or shielded. By a surface within the process chamber may be understood any surface arranged within the process chamber, thus in particular within an (outer) wall defining the process chamber. Inner surfaces of such an (outer) wall are therefore also arranged within the process chamber in this sense. In particular, these may be surfaces that come into contact or would come into contact with a (process) gas located within the process chamber if the heat reflecting means were not provided accordingly. The heat reflecting means can be directly connected to the portion to be shielded (which is preferred) or, if necessary, only indirectly arranged or arranged at a distance from this portion to be shielded.

Building area means in particular a two dimensional region (2D partial region) of a working plane of the manufacturing device for additive manufacturing, in which the beams of the at least one radiation unit can impinge on the building material for selective solidification or in which a build container extends which receives the component and can (also) contain the (unsolidified) building material. In this respect, the surface of the building area can be used for manufacturing. In particular, the building area can be understood as the top powder layer (2D surface). The building area is preferably round, in particular at least substantially circular, but can also assume other shapes, for example rectangular, in particular square.

Preferably, the manufacturing device is configured in such a way that first (for additive manufacturing) the (powdery) building material (at least partially at least at its surface) is preheated to comparatively high temperatures (e.g. greater than 200° C. or greater than 500° C. or greater than 700° C., optionally greater than 900° C. or greater than 1000° C., but optionally also less than 950° or less than 900° C. or even less than 850° C.) and is then selectively solidified by means of the at least one radiation unit. Such preheating and the resulting heat energy during irradiation by the radiation unit have the effect that parts of the manufacturing device (where this is not desired) heat up (and, for example, the heat can no longer be dissipated by a gas flow). By means of the heat reflecting means, it can be achieved that certain components of the manufacturing device can be or remain manufactured comparatively simply and inexpensively. In particular, it can be achieved that no particularly expensive materials have to be used which are characterized by an (extremely high) heat resistance.

According to an independent aspect of the invention (which is particularly preferably combined with the above aspect of a heat reflecting means), it is proposed to provide the manufacturing device with at least one (active) cooling means, in particular comprising at least one cooling plate and/or cooling wall. By means of such a cooling means, heat can be dissipated in certain areas, which also prevents (at least in certain areas) the occurrence of high or excessive temperatures. Particularly in combination with the heat reflecting means, it is achieved in an advantageous manner that on the one hand—via the heat reflecting means—certain (possibly particularly sensitive) areas are directly protected and on the other hand—via the (active) cooling means—the reflected heat can ultimately also be dissipated. This is a particularly simple and effective way of preventing the manufacturing device from being damaged (during operation) or being put out of action.

Active cooling means in particular that a cooling medium (cooling fluid, in particular cooling liquid) can flow within at least one (fluid) channel, so that the cooling medium (cooling fluid) can absorb heat and be guided to a location outside the process chamber, where it releases the heat again. In this respect, the active cooling means may include at least one fluid flow conveying device, e.g., pump and/or fan. However, such components can also be provided externally, if necessary (so that the manufacturing device comprises corresponding connection possibilities in this respect).

A cooling plate means in particular a device which is formed separately from (outer) walls of the manufacturing device or has a plate edge which is not (firmly) connected to an (outer) wall of the manufacturing device. Such a cooling plate may have a constant (or alternatively varying) thickness. The thickness is preferably (substantially) less than a maximum (geometrical) extension of the cooling plate perpendicular to the thickness direction. Such a maximum extension is preferably at least 5 times, further preferably at least 20 times as large as the thickness. To the extent that the thickness varies, an average thickness or a thickness of the largest contiguous area of constant thickness shall be used herein. The cooling plate is preferably rectangular in shape. In such a case, the above maximum extension would be the rectangular diagonal.

A thickness of the cooling plate is preferably at least 3 mm, further preferably at least 5 mm and/or at most 50 mm, preferably at most 15 mm. At least one fluid channel may be arranged within the cooling plate, or may be arranged on the cooling plate (for example as a cooling loop arranged on a surface of the cooling plate). The at least one (fluid) channel may have one or more deflection(s), for example meandering and/or looping.

The cooling wall can basically be designed like the cooling plate. A cooling wall can separate in particular two parts (rooms) of the manufacturing device from each other. Alternatively, a cooling wall can delimit the manufacturing device from the outside, in particular forming a housing wall at least partially. The cooling wall may in particular be an (outer) housing wall or may be a wall that delimits the manufacturing device from the outside. However, the cooling wall can also be, for example, a partition wall that separates individual portions from one another within a housing that defines the manufacturing device.

The (powdered) building material preferably comprises at least one metal and/or at least one material having a comparatively high melting point, such as a melting point of greater than or equal to 800° C., preferably greater than or equal to 1000° C. (optionally greater than or equal to 1200° C.; or greater than or equal to 1800° C.; or greater than or equal to 2000° C.), in particular comprising metal, for example (high-strength) aluminum, titanium, nickel, iron, and/or tungsten and/or molybdenum and/or alloys thereof, for example a titanium-aluminum alloy (preferably containing at least 10 wt.-% Al, further preferably at least 50 wt.-% Al), and/or a titanium aluminide. Preferably, the building material consists of at least 10 wt.-%, further preferably 50 wt.-%, still further preferably at least 80 wt.-%, still further preferably at least 99 wt.-%, of one or more metal(s).

According to an embodiment, the (powdered) building material may comprise or consist of TiAl-TNM-B1 and/or γ-TiAl. For example, the (powdered) building material may comprise, in atomic percent: Ti—43.5Al—4Nb—1Mo—0.1B.

In addition to a titanium-aluminum alloy, other difficult to or non-weldable alloys, e.g. Ni alloys (for example MAR-M247) as well as tungsten carbide-cobalt (and similar systems) can also be used. A "brittle-ductile transition" (at which welding becomes possible or above which the corresponding material has sufficient ductility to allow welding) may be in the range of at least 300, preferably 500° C., further preferably at least 600° C. and/or at most 1200° C., preferably at most 800° C.

A (mean) particle size (grain size) of the building material is preferably greater than 5 μm, further preferably greater than or equal to 15 μm and/or less than 300 μm, preferably less than 130 μm, further preferably less than 100 μm.

The particle size to be considered is preferably the diameter of a single particle or grain. If the particles are at least partially present as agglomerates, the diameter of a single particle (grain) of the agglomerate is to be considered. The diameter (particle size) of a single particle is preferably a respective maximum diameter (=supremum of all distances between two points of the particle) and/or a sieve diameter and/or an (especially volume-related) equivalent sphere diameter.

If the particle size is not uniform, the d50 particle size should preferably be used as the (mean) particle size. For the (average) particle size, the numerical value (here: 50) applies to the proportion of particles (in mass and/or volume percent) that are smaller than or equal to the specified particle size (i.e., for a d50 of 50 μm, 50% of the particles have a size≤50 μm).

The individual particles of the building material may be (at least approximately) equal in size, or a particle size distribution may be present. If a particle size distribution is present, for example, a d50 particle size may be at least 2 times, preferably at least 4 times, and/or at most 10 times, preferably at most 8 times, as large as a d10 particle size. Alternatively or additionally, a d90 particle size may be at least 1.2 times, preferably at least 1.8 times and/or at most 4 times, preferably at most 3 times as large as a/the d50 particle size. If necessary, the particle sizes can be determined by laser diffraction methods (in particular by means of laser diffraction measurement according to ISO 13320 or ASTM B822). Alternatively or additionally, the particle sizes can be determined by measuring (for example using a microscope) and/or with dynamic image analysis (preferably according to ISO 13322-2, if necessary using the CAMSIZER® XT from Retsch Technology GmbH). If the particle size is determined from a 2-dimensional image (e.g. of a microscope, in particular an electron microscope), the respective diameter (maximum diameter or equivalent diameter) resulting from the 2-dimensional image is preferably used.

A diameter perpendicular to the maximum diameter (=supremum of all distances between two points of the particle whose connecting line is perpendicular to the maximum diameter) is preferably at least 0.1 times, further preferably at least 0.5 times, further preferably at least 0.7 times and/or at most 1.0 times, preferably at most 0.9 times as large as the maximum diameter (either in the 3-dimensional or, in particular when determining the respective diameters from an image, in the 2-dimensional with respect to the image plane).

In the case of a particle size distribution, this can be uni-modal. However, a bi-modal or multi-modal particle size distribution is preferred. If a bi-modal particle size distribution is present, a first maximum of the particle size distribution is preferably at least 5 μm, further preferably at least 10 μm and/or at most 80 μm, preferably at most 50 μm, and a second maximum is preferably at least 81 μm, further preferably at least 100 μm and/or at most 300 μm, at most 260 μm. Alternatively or additionally, in the case of a bi-modal particle size distribution, a distance between the two maxima may be at least 50 μm and/or at most 150 μm and/or at most 200 μm.

Preferably, the oxygen content in the (powdered) building material is below 1000 ppm, further preferably below 800 ppm.

Particularly preferably, the heat reflective device is arranged to shield at least a portion of a component of the manufacturing device that is moving during operation of the manufacturing device. Particularly preferably, the heat reflective device shields at least a portion of a coating arm of the coating unit. As a result, (active) cooling components (cooling means) that would move along with the moving component can be dispensed with in a preferred manner for such moving components. For example, corresponding hose systems for a cooling medium (fluid) can then be dispensed with for moving operation. Such hose systems are comparatively expensive and represent sources of error and thus reduce the reliability of the manufacturing device. Particularly preferably, at least a portion of a coating arm of the coating unit is shielded. Further preferably, (at least substantially) the entire surface of the coating arm is coated. This can reduce the area of uncoated material through which heat can be transferred to a/the actuator. It has been recognized that heat is conducted in particular via the coating arm in the direction of a drive of the coating unit, which is then in turn problematic for this drive. Such heat transfer can be reduced by a heat reflecting means (directly) on the coating arm. Thus, a robust manufacturing device can be realized in a simple way.

In a specific embodiment, the heat reflecting means shields at least one portion of the at least one coating unit, in particular at least one portion of a drive of the at least one coating unit. This enables structures and/or materials to be used for the drive itself that are less complex in terms of heat resistance than in comparison with a design without a heat reflecting means. The coating unit or its drive can be specifically protected.

Preferably, the heat reflecting means shields at least a portion of a process chamber wall and/or a partition wall dividing the process chamber. In this context, a process chamber wall is preferably understood as a side wall (extending at least essentially vertically), but it may also be a ceiling wall. On such walls, a heat reflecting means can be applied in a comparatively simple manner, whereby components of the manufacturing device can be protected in a simple manner.

The heat reflecting means is preferably arranged (at least partially, possibly completely) above a level of the building area. This provides effective protection against heat emitted from the building area.

The coating unit, in particular a (the) drive of the coating unit, is preferably partially arranged behind a, in particular lateral, partition wall, in particular cover plate. The heat reflecting means preferably shields this partition wall at least partially, and is further preferably applied to this partition wall at least partially, preferably directly. In this way, the coating unit, in particular its drive, can be protected from too high temperatures in a simple and reliable manner. The heat reflecting means can be connected indirectly or directly to the respective portion to be shielded.

The heat reflecting means is preferably material bonded to the respective portion to be shielded.

Under a side partition any wall between an upper wall or ceiling and a floor of the manufacturing device (which is not an exterior wall) is preferably understood. Such walls may be substantially vertical. Specifically, the side wall may be a side close to the building area and/or a rear side (close to the building area in the sense that the side wall close to the building area is the side wall closest to the building area or at least closer than adjacent side walls). A rear side is defined in particular by the fact that it is furthest away (or opposite) from a "front side", which in turn can preferably be defined by a closable opening (in particular, possibly pivotable, door). The partition wall mentioned here may be a first partition wall. Other partition walls may be provided, for example a second partition wall (in particular the second partition wall mentioned below).

A layer thickness of the heat reflective layer is preferably at least 5 nm, further preferably at least 10 nm, further preferably at least 50 nm, optionally at least 100 nm and/or at most 10 μm, preferably at most 1 μm, further preferably at most 500 nm, further preferably at most 200 nm.

An (exposed) surface of at least one or all heat reflecting means(s) may be at least 10 cm$^2$, preferably at least 100 cm$^2$, further preferably at least 1000 cm$^2$ and/or at most 10000 cm$^2$, preferably at most 5000 cm$^2$. By an exposed surface is meant, in particular, that surface of the heat reflecting means on which (during operation) thermal radiation impinges. Such an exposed surface may in particular be in contact with a gas inside the process chamber.

An (the) exposed surface area of the heat reflective device is preferably at least 5%, further preferably at least 20%, still further preferably at least 50% and/or at least (approximately exact) 100% or optionally less than 100%, optionally at most 90% of a total exposed surface area of at least one wall (for example side wall) or component, in particular the coating arm, within the process chamber.

In general, the heat reflecting means may be applied to one, two or more walls. In one embodiment, however, the heat reflecting means is arranged on only one (side) wall, namely (but this is not mandatory) a rear (back) (partition) wall.

A material of the heat reflecting means preferably comprises at least partially: at least one metal or at least one metal alloy, preferably comprising Al, Ni, Cr, Fe, Au, Ag and/or Pt, particularly preferably comprising Au and/or Ag. The respective metals, in particular noble metals (in combination or by themselves), preferably gold may be provided at least with 10% by weight, preferably at least 50% by weight, optionally at least 90% by weight or at least 98% by weight.

A shielding of the respective portion can be at least partially realized by applying a heat reflective layer, in particular a coating, to the respective portion, preferably by material-bonding, for example by vapor deposition and/or spraying and/or doctoring and/or dipping and/or electroplating and/or bonding.

A layer is understood to mean, in particular, a device that is arranged in a planar manner on the portion to be shielded. This can be, for example, a foil applied to the portion and/or wrapped around a portion. A coating is a special case of a layer. A coating is to be provided in particular if the layer of heat reflecting material is connected to the portion to be shielded over a (large) area, in particular over an entire surface.

The heat reflective layer (coating), e.g. of gold, can be applied to an adhesion-promoting layer, preferably with a layer thickness of more than 2 nm and/or less than 100 nm, preferably less than 5 nm (e.g. comprising Ni and/or Cr). A pretreatment, in particular plasma pretreatment, can be carried out to activate a surface to be coated with the heat reflective layer (coating), e.g. of gold.

If necessary, there may be a distance between the portion to be shielded and the heat reflecting means, for example of at least 0.1 μm and/or at most 100 mm, preferably at most 10 mm. Preferably, however, the heat reflecting means (layer) is in direct contact with the portion to be shielded.

An (exposed) surface of the heat reflective device is preferably polished and/or has a (mean) roughness (preferably according to ISO 1302:2002) of preferably less than 1 μm, further preferably less than 500 nm.

With an assumed wavelength of 5 μm and an assumed perpendicular angle of incidence of the (thermal) radiation impinging on the heat reflecting means (layer), the heat reflecting means should preferably (at least in some areas) have a reflectance (ratio between reflected and incident intensity) of at least 80%, further preferably at least 90%, still further preferably at least 95%, still further preferably at least 99%. Even though such a wavelength and also a perpendicular angle of incidence (in operation) may be realized, these values serve here initially only to define or determine the degree of reflection. This can deviate depending on the actually present wavelength and the actually present angle of incidence. However, in the case of gold, for example, the reflection is also (at least essentially) independent of a wavelength from (at least approximately) 1 μm.

At least one (active) cooling means is preferably arranged to intersect at least one line perpendicular to at least one (exposed) surface portion of the heat reflecting means. Preferably, this condition applies to at least 50%, still further preferably to at least 80%, optionally at least 95% of the total (exposed) surface area of the heat reflecting means. As a result, heat reflected by the heat reflecting means can be dissipated particularly effectively.

At least one (active) cooling means can be arranged opposite the heat reflecting means, in particular in or on a wall opposite at least one portion of the heat reflecting means. This also allows heat reflected by the heat reflecting means to be dissipated in an effective manner.

On a wall on which a heat reflecting means is provided (arranged), in particular a wall opposite another wall on which an (active) cooling means is provided or arranged, no (active) cooling means can be provided if necessary. Thus, efficient cooling can be achieved with comparatively few components. Specifically, one of the two walls can be protected by the heat reflecting means, whereby reflected heat (and remaining heat or heat) can be effectively absorbed by the opposite wall. However, in an alternative embodiment, an (active) cooling means can also be provided on that wall on which a heat reflecting means (coating) is arranged.

In embodiments, at least one (active) cooling means can be arranged in at least one side region, preferably close to the building area, preferably in a (front) side region opposite at least one portion of the heat reflecting means, preferably on and/or in a door. In this way, (reflected) heat can be dissipated in a particularly advantageous manner. By a side region close to the building field is meant in particular a side region which is closer to a building field than at least two other side regions and/or a side region which extends parallel to a direction of movement of a/the coating arm and/or a side region which is not separated from the building field by a storage and/or collecting container. The door may have a (transparent) opening (window). If an (active) cooling means is integrated in or arranged in the door, the (transparent) opening can be part of or surrounded by the (active) cooling means.

At least one (active) cooling means can be arranged in a ceiling area, preferably in or below a suspended ceiling or defining such a ceiling. This can also be an effective way of dissipating heat, especially if it is reflected by a heat reflecting means on a side wall (especially a rear side wall). In particular, heat radiation originating from the building area, which is then reflected via a heat reflecting means arranged on a side wall (in particular a rear side wall) in the direction of a (possibly suspended) ceiling, can thus be effectively dissipated.

In alternative embodiments, at least one (active) cooling means may be arranged in at least one side region not opposite the heat reflecting means and/or not having a heat reflecting means.

At least one (active) cooling means, in particular cooling plate, may be present as a separate module, which is preferably mounted or mountable on or spaced from an inner surface of a chamber (outer) wall or partition. The mounting is preferably reversible (in the sense that the mounting is carried out via releasable, possibly manually releasable, fastening devices). In this way, it is particularly easy to equip or upgrade or retrofit an (existing) manufacturing device.

At least one (active) cooling means can have at least one fluid channel, preferably in or on the cooling plate and/or cooling wall, through which a cooling fluid, in particular a cooling liquid, can flow. The fluid channel may have (at least in sections) a round or oval or rectangular, in particular square, cross-section. A cross-sectional area (perpendicular to a flow direction) may be at least $0.05$ cm$^2$, preferably at least $0.4$ cm$^2$ and/or at most $8$ cm$^2$, preferably at most $2$ cm$^2$, at least partially.

One, two or more cooling loop(s) may be provided, possibly each with its own (fluid) inlets and/or (fluid) outlets (in particular as part of the same (active) cooling means, in particular cooling plate). A first cooling loop cools in particular a central area close to the building area. Specifically, the first cooling loop may be located within an area (optionally complete) which has a distance to (vertical) side edges of the (active) cooling means (cooling plate) of at least 10%, preferably at least 20%, optionally at least 30% of the length (preferably in horizontal direction). Alternatively or additionally, the first cooling loop may extend up to a level of the building area and/or up to a lower end of the cooling means/cooling plate. A second cooling loop may be provided for outer regions of the cooling plate and/or may be arranged (at least partially, for example forming a U-shape) around the first cooling means. Such a division allows a central part close to the building area to be cooled particularly effectively. An outlet of the second (outer) cooling loop can, if necessary, be connected to an inlet of the first cooling loop and thus outer regions can be cooled first and then a central part. According to an independent (further) inventive idea, at least two cooling loops are thus proposed within a cooling plate, wherein a first cooling loop is arranged within the second cooling loop (so that an area close to the building site can be cooled particularly effectively via the first cooling loop).

In general, the inlet and outlet of a (possibly single) cooling loop on a respective cooling means (cooling plate)

can be arranged in such a way that the area close to the structure and/or the central area is flowed through first (whereby the cooling fluid heats up) and then only outer areas of the cooling means (cooling plate). This allows to extract most of the heat where most of the heat is also received, thus increasing efficiency.

Inside at least one (active) cooling means, in particular cooling plate, a (transparent) opening may be provided. Thus, despite the cooling means provided, an interior of the process chamber can be at least partially viewed. This simplifies the operation of the manufacturing device.

A (transparent) opening (window) in a door can be designed to be comparatively small so that the door can simultaneously accommodate a cooling means or be designed as such. A corresponding (transparent) opening can make up less than 20%, possibly less than 10%, of a door area and/or be less than 0.5 times, preferably less than 0.2 times, as large as the cooling means in terms of area.

At least one (active) cooling plate can be made of one part or, if necessary, in several parts. A multi-part design facilitates or enables in particular a retrofitting of an (existing) manufacturing device. For example, individual parts of the cooling plate can be inserted through an opening (e.g., door) and then connected within the process chamber to form an assembled cooling plate. For example, at least one (active) cooling plate can consist of at least two or at least three, possibly at least four, individual parts that can be assembled.

The (respective) cooling plate preferably covers at least substantially a total area of the respective wall on which the cooling plate is arranged (possibly except for an opening for optical inspection of an inside of the manufacturing device, in particular of the building area). As a result, turbulences can be suppressed or at least reduced (in particular in an edge region), which has an advantageous effect on a gas flow within the process chamber.

Furthermore, at least one (second, in particular upper) partition wall can be provided and arranged in such a way that a delimited intermediate space is formed in a ceiling area.

The partition wall preferably has at least one opening (in particular in the area of an optical and/or heat generating device).

In the intermediate space and/or in and/or on the partition wall at least one optical device, in particular a camera, is preferably arranged. Via the camera, an inside of the process chamber, preferably at least the building area, can preferably be detected. For this purpose, the (second) partition wall preferably comprises a corresponding opening or a plurality of openings. Such an optical device can be cooled by an (active) cooling means associated with the (second) partition wall or integrated therein, or can have an (own), possibly active, cooling means.

In the intermediate space and/or in and/or on the (second) partition wall preferably at least one heat generating device, in particular a radiant heater, can be arranged. Preferably, at least one laser-based element, e.g. comprising at least one corresponding laser diode array, in particular based on VCSEL (Vertical Cavity Surface Emitting Laser), is used as the radiant heater or heating element. Such elements generate highly directional radiation starting from a small area. The individual laser elements can be controlled in a targeted manner, which means that the radiation distribution and thus the temperature on the surface of the device can be controlled very well. The heat generating device is preferably configured in such a way that heating (in particular by thermal radiation) of the building area or of the building material arranged there is made possible. In this case, the partition wall preferably comprises at least one corresponding opening so that rays from the heat generating device can pass through the (second) partition wall. Such a heat generating device (in particular radiant heater) can also have a (separate), possibly active, cooling means and/or be cooled by a cooling means associated with the (second) partition wall.

The partition wall may be an (active) cooling means. Alternatively or additionally, an (active) cooling plate may be provided (below the partition).

In general, a (the) process gas can be cooled down, in particular actively. For this purpose, for example, a cold source (or heat sink) and/or a cold-generating (or heat-dissipating) heat pump may be provided.

In one embodiment, a fluid guide is provided and configured in such a way that a fluid, in particular gas, preferably process gas, can flow through the intermediate space. In this way, cooling and/or thermal shielding of the component(s) provided there (e.g. optical device and/or heat generating device) can be performed in a simple manner. For this purpose, the process gas can be (actively) cooled down before flowing into the intermediate space, if necessary. The elements in the intermediate space are preferably overflowed by a gas inflow in the upper area of the process chamber. A gas outflow preferably takes place together with a gas flow running vertically above the building area. The introduction of a cooled gas can additionally be used to reduce the temperature in the process chamber.

In some embodiments, at least one (further) inlet for the process gas may be provided above a cooling lid. This allows gas to flow from above into the process chamber via the cooled lid downwards towards the process zone and/or gas outlet. In addition to the cooling effect, a blocking flow is preferably additionally generated here, which prevents or at least counteracts hot gases from rising and/or weld spatter and/or vaporization products from reaching the top, e.g., sensors, a lens of the process laser, heating modules, and/or a camera (etc.).

An oxygen content of a process gas (shield gas) is preferably below 1000 ppm, further preferably below 500 ppm or below 300 ppm or below 100 ppm and/or above 10 ppm, optionally above 50 ppm. The power of a laser used may be 50 to 350 watts. A scan speed may be 800 to 3500 mm/s. A hatch distance may be 20 to 160 μm. A drop path of a building platform may be 20 to 120 μm. A length of the exposure path of the laser may be greater than 10 mm.

Irradiating strategies such as checkerboard irradiating, alternating hatching (first fill every second area of several sub-areas, then fill the gaps) and/or special rotation angles of the irradiating pattern are conceivable, especially to reduce internal stresses.

According to a further aspect of the invention, a method for operating a manufacturing device of the above type for additive manufacturing of three-dimensional components by layer wise application and locally selective solidification of a building material is proposed. Further process steps result from the description of the manufacturing device, in particular the functional features explained there. In the process, the building area may be preheated at least locally to at least 300° C., preferably to at least 500° C., further preferably to at least 700° C., optionally to at least 900° C. or at least 1200° C.

According to a further aspect of the invention, a method for producing a manufacturing device for additive manufacturing of three-dimensional components by layer wise application and locally selective solidification of a building material of the above type is proposed, wherein an (existing) manufacturing device for additive manufacturing of three-dimensional components by layer wise application and locally selective solidification of a building material is provided and is equipped or retrofitted with at least one heat reflecting means, preferably initially provided separately, and/or is equipped or retrofitted with at least one active, preferably initially provided separately, cooling means module, preferably with a cooling plate.

According to a further aspect of the invention, a set (kit) is proposed comprising a manufacturing device for additive manufacturing of three-dimensional components by layer wise application and locally selective solidification of a building material (in particular of the above type) and a (separate) active cooling means module, preferably in the form of a cooling plate.

BRIEF DESCRIPTION OF THE DRAWINGS

The invention is described below on the basis of embodiment examples, which are explained in more detail with reference to the figures. The figures show the following.

DETAILED DESCRIPTION OF THE EMBODIMENTS

In the following description, the same reference numbers are used for the same parts and parts with the same effect.

Figure 1:
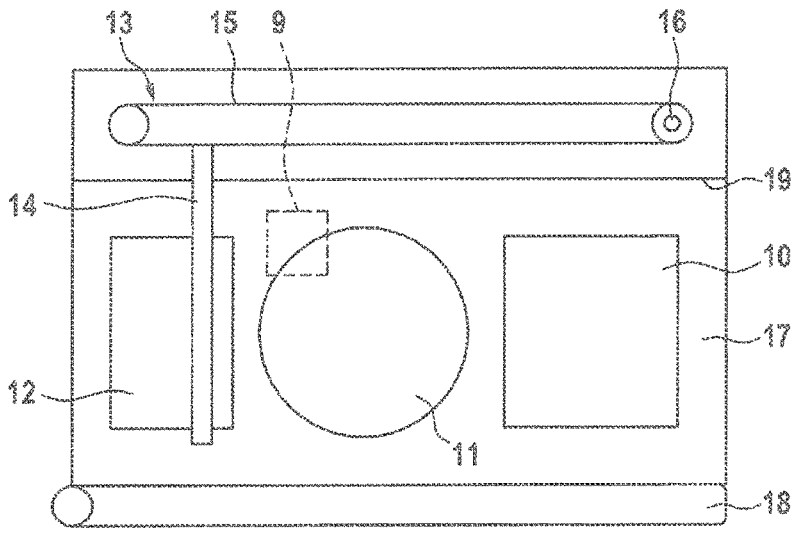
FIG. 1 a schematic view of a manufacturing device for additive manufacturing of three-dimensional components in a horizontal section.

FIG. 1 shows a schematic horizontal section of a manufacturing device, preferably in the form of a laser sintering or laser melting device, for additive manufacturing of three-dimensional components. The manufacturing device comprises a storage container 10 for a (powdered) building material, a building area 11 and a collection container 12. Furthermore, a coating unit 13 is provided, which has a coating arm 14 and a drive 15 comprising a motor 16. An radiation unit 9 is shown dotted and only schematically. The radiation unit preferably comprises at least one laser.

The drive 15 moves the coating arm 14 over the storage container 10, the building area 11 and the collection container 12, thereby applying a (new) layer of building material. A process chamber 17 is accessible from the outside (front) via a (in particular pivotable) door 18. The drive 15, including motor 16, is separated from an area of the process chamber 17 comprising the building area 11 by a partition wall 19 (preferably in the form of a cover plate). The partition wall 19 can prevent or at least reduce contamination of the drive 15 during the manufacturing process.

Figure 2:
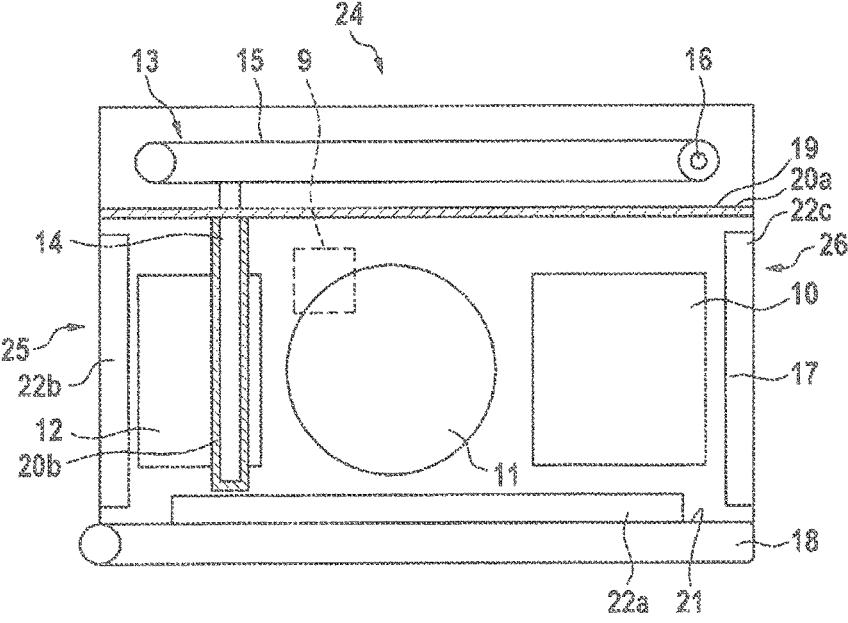
FIG. 2 a schematic view of a manufacturing device according to the invention for additive manufacturing of three-dimensional components in a horizontal section.

FIG. 2 shows a schematic horizontal section of a manufacturing device according to the invention, preferably in configured as a laser sintering or laser melting device (analogous to FIG. 1). The manufacturing device according to the invention corresponds to the manufacturing device according to FIG. 1 with the additional features described below. The partition wall 19 (cover plate) is coated with a heat reflective layer 20a.

The heat reflective layer 20a is in contact with a process gas inside the process chamber 17. Similarly, the coating arm 14 is coated with a heat reflective layer 20b. The drive 15 including motor 16 is thus not affected by comparatively high temperatures (without the need for active cooling arranged in this area).

A (front) cooling plate 22a is mounted on an inner side 21 of the door 18. (Side) cooling plates 22b, 22c are arranged on sides 25, 26 connecting a front side 23 and a rear side 24.

Figures 3, 4, 5:
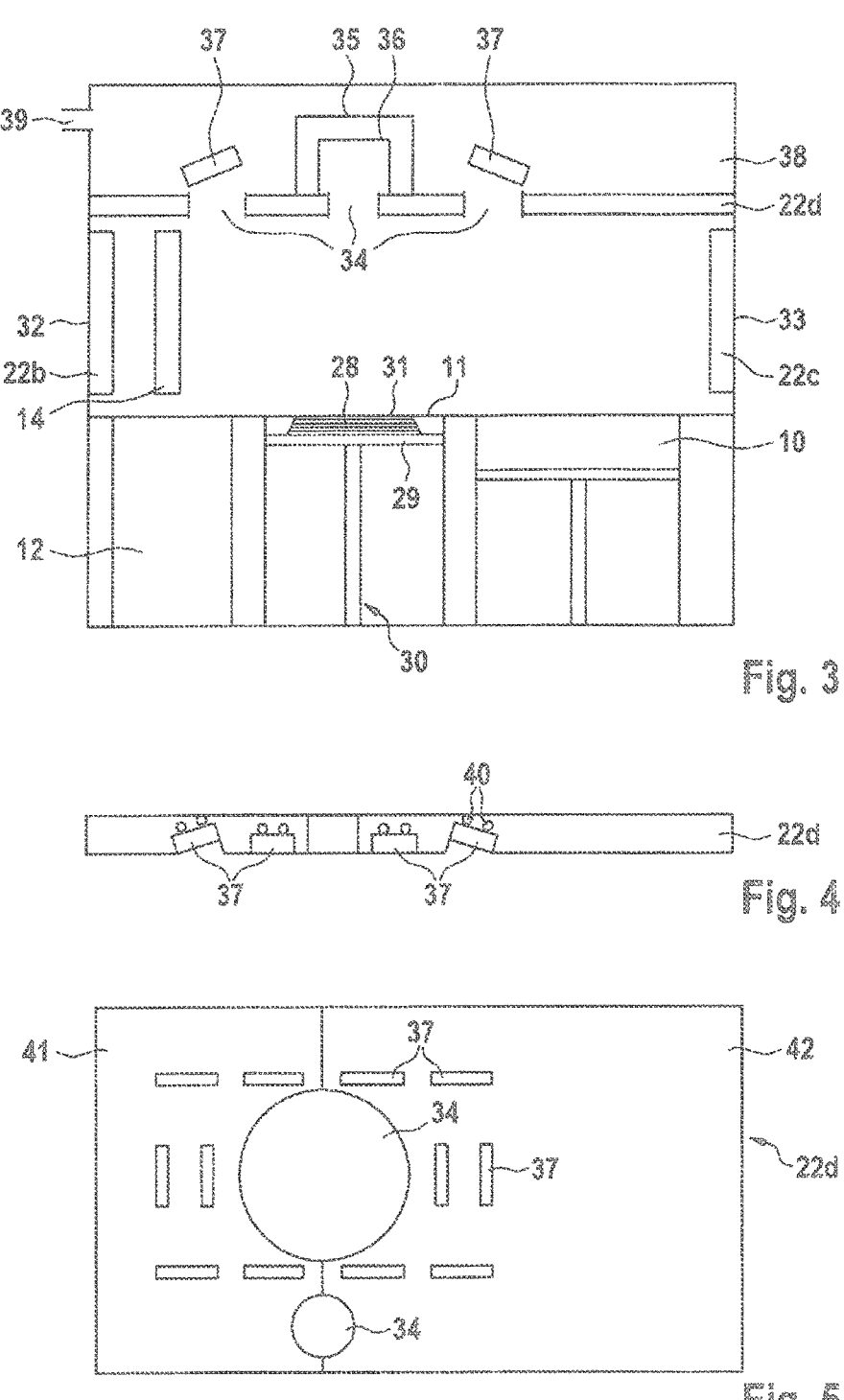
FIG. 3 the manufacturing device according to FIG. 2 in a vertical section.
FIG. 4 a ceiling cooling plate according to the invention in a vertical section.
FIG. 5 a ceiling cooling plate according to the invention in a top view.

FIG. 3 shows a schematic vertical section through the manufacturing device according to the invention. Again, the storage container 10, the building area 11 and the collection container 12 are visualized here. (Solidified) building material 28 in the area of the building area 11 can be lowered by a buildup platform 29. A (vertical) drive 30 is provided for this purpose. The height of the storage container 10 can also be adjusted (via a corresponding drive).

Above a building plane 31, the (lateral) cooling plates 22b, 22c can be seen on (side) walls 32, 33. In the state according to FIG. 3, the coating arm 14 is located above the collecting container 12 and moves above the building plane 31. Furthermore, a (ceiling) cooling plate 22d (forming a partition wall) can be seen in FIG. 3. The (ceiling) cooling plate 22d delimits an intermediate space 38 within the process chamber 17.

Openings 34 are provided in the (ceiling) cooling plate 22d. One opening 34 is located below an optical unit 35, another below a camera 36 (see also FIG. 5). Further openings 34 are each located below radiant heaters 37. The building area 11 can be (obliquely) irradiated via the radiant heaters 37. In this sense, the radiant heaters 37 are thus oriented obliquely. Alternatively or additionally, one or more lenses can be provided to direct heat radiation from the radiant heaters 37 onto the building area 11.

The (ceiling) cooling plate 22d can (additionally) be cooled or flooded by (cooled) gas, in particular process gas. An inlet 39 is provided above the cooling plate 22d for this purpose. In this way, impurities that occur during the manufacturing process can also be at least partially eliminated. The gas flows around the optical unit 35, the camera 36, and the radiant heaters 37. A gas outlet (not shown in the figures) can end at building area height (together with a gas flood of the building area 11; not shown).

FIG. 4 shows an embodiment of a (ceiling) cooling plate 22d with (integrated) radiant heaters 37. The radiant heaters 37 can be aligned with the building area 11 by means of inclined mounting surfaces and/or the beam path can be aligned with the building area 11 by means of (optical) lenses. A cooling of the radiant heaters 37 can, if necessary, take place via (separate) cooling means 40 (cooling loops) in the (ceiling) cooling plate 22d and/or by means of a cooling means (cooling loop) for the (ceiling) cooling plate 22d.

FIG. 5 shows a top view of a (ceiling) cooling plate 22d according to the invention. The openings 34 for the camera 36 and the optical unit 35 can be seen here. Furthermore, an arrangement of radiant heaters 37 surrounding the opening for the optical unit is shown. Specifically, twelve radiant heaters 37 are provided here, but more or fewer radiant heaters 37 may be provided.

Furthermore, it can be seen that the (ceiling) cooling plate 22d comprises two parts 41, 42. These parts 41, 42 may be separate from each other in a pre-assembly state and then (together) form the (ceiling) cooling plate 22d in the assembly state. By such a two-part (generally: multi-part) design, a retrofit into an (existing) manufacturing device can be simplified.

Figure 6:
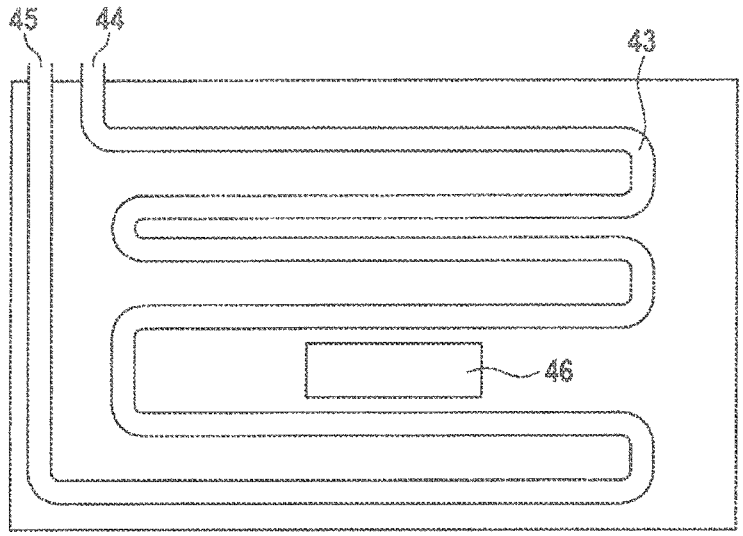
FIG. 6 a schematic illustration of an embodiment of a cooling plate according to the invention.

FIG. 6 shows a schematic section through a cooling plate 22 (e.g. the cooling plate 22a) with a cooling loop 43 passing through the entire cooling plate 22. A cooling medium (fluid, in particular liquid) is introduced via an inlet 44 and discharged via an outlet 45.

A cutout (window) 46 is provided in the cooling plate 22 through which the building area 11 can be observed.

Figure 7:
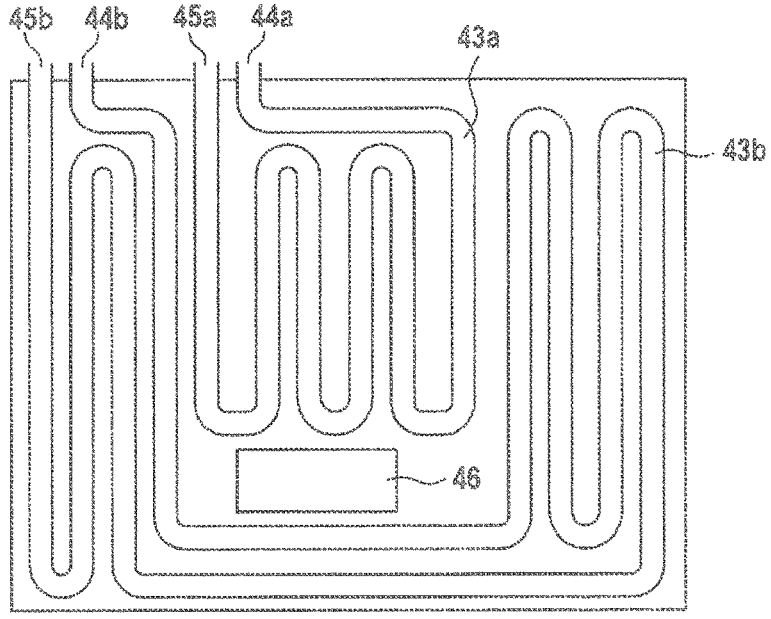
FIG. 7 a schematic illustration of a further embodiment of a cooling plate according to the invention.

In a different embodiment according to FIG. 7 (in particular for the front cooling plate 22a), two cooling loops 43a, 43b are provided. The first cooling loop 43a cools in particular a central area close to the building area with its (own) inlet 44a and its own outlet 45a. Furthermore, the second cooling loop 43b is provided for outer areas of the cooling plate 22 and has a (separate) inlet 44b and outlet 45b. By such partition, a central part close to the building area can be cooled particularly effectively. It is also possible to connect the outlet 45b of the second (outer) cooling loop 43b with the inlet 44a of the first cooling loop 45a and thus to cool outer areas first and then a central part.

At this point it is stated that all parts described above, taken individually and in any combination, in particular the details shown in the figures, are claimed to be essential to the invention. Modifications thereof are familiar to those skilled in the art.

REFERENCE SIGN 9 radiation unit
10 storage container
11 building area
12 collection container
13 coating unit
14 coating arm
15 drive
16 motor
17 process chamber
18 door
19 partition wall (cover plate)
20a heat reflective layer
20b heat reflective layer
21 inside
22a cooling plate
22b cooling plate
22c cooling plate
22d cooling plate
23 front
24 back
25 side
26 side
28 building material
29 building platform
30 (vertical) drive
31 building plane
32 side wall
33 side wall
34 opening
35 optical unit
36 camera
37 radiant heater
38 intermediate space
39 inlet
40 cooling means
41 first part
42 second part

43 cooling loop
43*a* cooling loop
43*b* cooling loop
44 inlet
44*a* inlet
44*b* inlet
45 outlet
45*a* outlet
45*b* outlet
46 cutout

The invention claimed is:

1. An improved manufacturing device for additive manufacturing of three-dimensional components by layer wise application within an enclosed process chamber, the improvement comprising:

a coating unit including an elongated coating arm, the coating arm being mounted for movement within the process chamber and having an encompassing exterior to the coating arm extending within the process chamber;

a drive that moves the coating arm with a motor, the motor being physically connected to the coating arm;

a radiation unit that applies radiation to heat and fuse building material within a build area of the process chamber to selectively solidify the building material in layer-wise fashion to create a solid object;

a first heat reflecting layer covering the encompassing exterior of the coating arm in its entirety;

a partition wall at least partially separating the motor from the process chamber, wherein a part of the coating arm extends through the partition wall; and a second heat reflecting layer coating a surface of the partition wall that faces the process chamber and through which the coating arm extends and which reflects heat away from the partition wall, wherein the first and second heat reflecting layers combining to reduce heat transfer from the coating arm and process chamber to the motor;

a second partition wall in a ceiling region and defining an intermediate space; and at least one of an optical camera located in the intermediate space, a radiant heater located in the intermediate space, and a fluid guide configured such that a gas is flowable through the intermediate space, wherein the second partition wall comprises at least one opening, in a region of the optical camera or the radiant heater.

2. The manufacturing device according to claim 1, further comprising an active cooling means that includes at least one cooling plate or cooling wall.

3. The manufacturing device according to claim 2, wherein the active cooling means is arranged opposite to the second heat reflecting layer.

4. The manufacturing device according to claim 1, wherein the second heat reflecting layer further shields at least a portion of the drive from heat originating from the process chamber.

5. The manufacturing device according to claim 1, wherein the second heat reflecting layer is bonded to the surface of the partition wall that faces the process chamber or wherein the second heat reflecting layer is connected to the surface of the partition wall that faces the process chamber.

6. The manufacturing device according to claim 1,
 wherein a layer of the first or second heat reflecting layer is at least 10 nm in thickness; or
 wherein a material of the first or second heat reflecting layer comprises at least one metal or at least one metal alloy comprising Al, Ni, Cr, Fe, Au, Ag or Pt; or
 wherein the first or second heat reflecting layer includes a coating, or a material-bonding application including vapor deposition, spraying, scraping, dipping, electroplating, or gluing.

7. The manufacturing device according to claim 2, wherein the active cooling means is arranged in at least one side region opposite the second heat reflecting layer.

8. The manufacturing device according to claim 2, wherein the active cooling means is arranged in a ceiling area.

9. The manufacturing device according to claim 2,
 wherein the active cooling means is arranged in at least one side region which is not opposite the second heat reflecting layer; or
 wherein the active cooling means includes a cooling plate provided as a separate module mounted on an inner surface of a chamber wall; or
 wherein the active cooling means includes at least one fluid channel, in or on the cooling plate or a cooling wall through which a cooling fluid is flowable; or
 wherein a transparent opening including a cutout; is provided within the active cooling means.

* * * * *